A. Hatch,
Fishing Reel,

Nº 55,653. Patented June 19, 1866.

Witnesses:
W. H. Nettleton
R. Fitzgerald

Inventor
A. Hatch.

UNITED STATES PATENT OFFICE.

ANSON HATCH, OF NEW HAVEN, CONNECTICUT.

IMPROVEMENT IN FISHING-REELS.

Specification forming part of Letters Patent No. 55,653, dated June 19, 1866.

*To all whom it may concern:*

Be it known that I, ANSON HATCH, of the city and county of New Haven, in the State of Connecticut, have invented a new and useful Improvement in Fishing-Reels, as an improvement on that patented by W. Billinghurst August 9, 1859; and I do hereby declare that the following is a full, clear, and exact description of the construction, character, and operation of the same, reference being had to the accompanying drawings, which make part of this specification, in which—

Figure 1:
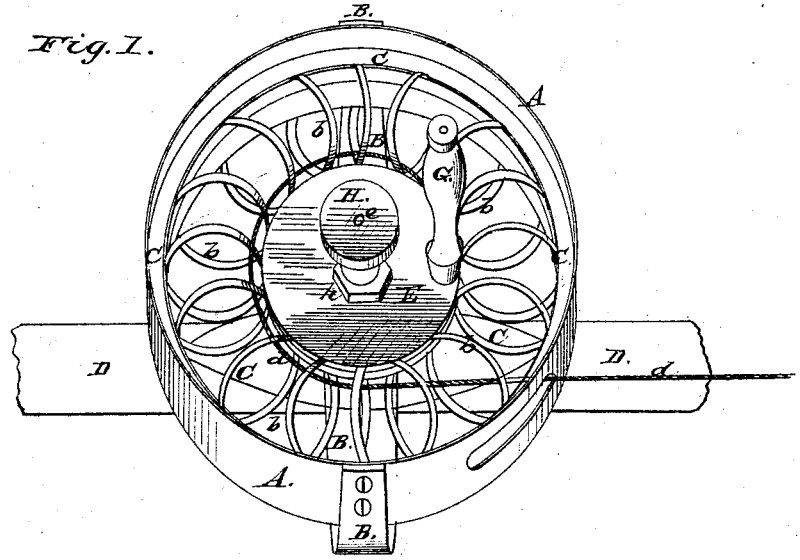
Figure 2:
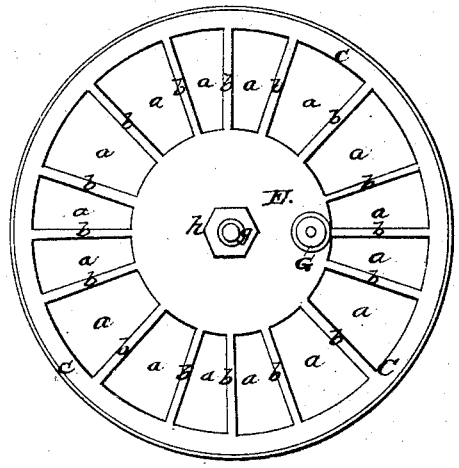
Figure 3:
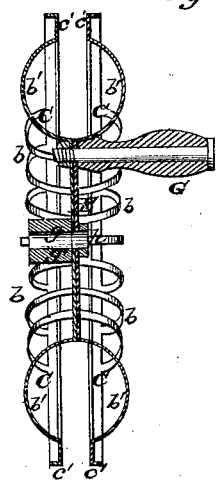

Figure 1 is a perspective view of the reel ready for use, showing all of its parts as attached to the pole or rod. Fig. 2 is a circular plan of the same with the outer band removed, showing substantially the shape of each disk as it is cut from the sheet of metal before it is struck up. Fig. 3 is a section of the same with the outer band removed, cut diametrially through the center, and showing the flanges turned at the extreme outer edges or periphery.

My improvement consists in making the skeleton or internal spool (or reel proper) for the line of two pieces of sheet metal, by pressing, swaging, or cutting them into the desired form or shape, and then, by striking them up or swaging, raise the small connecting bars or pieces to a shape suited to form the skeleton-spool into which the line is to be wound, as represented by the red line $d$, Fig. 1.

I make the outside band or rim, A A, Fig. 1, of sheet metal, and strengthen it by a crossbar, as indicated at B B B B, Fig. 1, made of sufficient strength to hold the whole firm and steady for use; and to the central part of this bar B, at right angles, I attach a section of a semi-cylindrical plate or scale, as indicated at C C, Fig. 1, to which the pole is to be attached by rings or otherwise.

To make the parts of the skeleton-spool (or reel proper) I cut, by a press or otherwise, a disk of sheet metal of the proper size and shape to constitute one side of the spool, substantially as shown in Fig. 2, when the spaces $a\ a$, &c., are cut out, (by the same motion of the press,) and the bars $b\ b$, &c., being parts of the original plate, are ready to be struck up or swaged to the shape shown at $b'$ and $b'$, Fig. 3, where, at both top and bottom, a pair of the bars are shown in their entire shape—that is, each raised to nearly a semicircle—to form the ribs of the skeleton-spool into which the line is to be reeled, as represented in red lines at $d$, Fig. 1. The outer web, $c$, of this disk I leave whole, of sufficient width to give the reel reasonable strength and steadiness, and the extreme edge or periphery I turn over to form a right-angled flange, as shown at $c'$ and $c'$, Fig. 3, to prevent the periphery of the disk from springing out of shape when in use, as indicated for the whole of the circle in Fig. 2.

I attach a pillar or stud to the center of the crossing of the bar B and scale C, one end of which is shown at $e$, Fig. 1, on which the reel or spool revolves.

Having made the several parts as before described, I place the two disks or sides, as Fig. 2, with their central solid parts, E, together, as shown in section in Fig. 3 and as indicated in Fig. 1, and secure them in that position by a hollow or sleeve screw, (shown at $g\ g$, Fig. 3,) through which the stud $e$ passes, and secure it by a nut, as $h$, Figs. 1, 2, and 3; and to prevent their moving on each other to change their relative positions I screw in the crank-pin G within the solid part E, and then insert the completed spool (or reel proper) into the frame or inclosing cylindrical band A A, and turn on the milled nut H, Fig. 1, when the reel will be ready for use. This milled nut H may be used as a brake when needed.

One of the most important advantages in my improvement over that of Mr. Billinghurst is that he makes his skeleton-spool of wire, which requires many pieces to be soldered together, while by making mine of sheet metal I use but two pieces, and can therefore make the article much lighter in proportion to its size, and at much less expense, and so that it will be much less liable to get out of repair, while it is at least as good for all purposes or reasons whatever.

I do not claim making a skeleton or internal reel, as such, because one made of wire was invented by W. Billinghurst and patented by him August 9, 1859; but

What I claim as my invention, and desire to secure by Letters Patent, is—

The skeleton-spool, in combination with the band A A, when the whole is constructed, arranged, and fitted for use, substantially as herein described.

A. HATCH.

Witnesses:
W. H. NETTLETON,
R. FITZGERALD.